United States Patent
Kawashima

(10) Patent No.: US 12,332,108 B2
(45) Date of Patent: Jun. 17, 2025

(54) CONVEYER AND COMBINATION SCALE EQUIPPED WITH THE SAME

(71) Applicant: YAMATO SCALE CO., LTD., Akashi (JP)

(72) Inventor: Takaaki Kawashima, Akashi (JP)

(73) Assignee: Yamato Scale Co., Ltd., Akashi (JP)

( * ) Notice: Subject to any disclaimer, the term of this patent is extended or adjusted under 35 U.S.C. 154(b) by 454 days.

(21) Appl. No.: 17/916,411

(22) PCT Filed: Apr. 15, 2020

(86) PCT No.: PCT/JP2020/016558
§ 371 (c)(1),
(2) Date: Sep. 30, 2022

(87) PCT Pub. No.: WO2021/210093
PCT Pub. Date: Oct. 21, 2021

(65) Prior Publication Data
US 2023/0152146 A1 May 18, 2023

(51) Int. Cl.
G01G 19/393 (2006.01)
B65G 15/00 (2006.01)
G01G 11/00 (2006.01)

(52) U.S. Cl.
CPC .......... G01G 19/393 (2013.01); B65G 15/00 (2013.01); *G01G 11/003* (2013.01)

(58) Field of Classification Search
CPC .... G01G 11/00; G01G 11/003; G01G 19/387; G01G 19/393; B65G 15/00
See application file for complete search history.

(56) References Cited

U.S. PATENT DOCUMENTS

| | | | | |
|---|---|---|---|---|
| 4,442,932 A | * | 4/1984 | Sashiki | G01G 19/393 198/429 |
| 4,821,820 A | * | 4/1989 | Edwards | G01G 19/393 177/1 |
| 12,084,285 B2 | * | 9/2024 | Ichihashi | B65G 11/166 |

FOREIGN PATENT DOCUMENTS

| | | |
|---|---|---|
| CN | 207712815 U | 8/2018 |
| JP | 11-334835 A | 12/1999 |
| JP | 11-343018 A | 12/1999 |
| JP | 2004-18236 A | 1/2004 |
| JP | 2015-129046 A | 7/2015 |
| JP | 3198402 U | 7/2015 |

* cited by examiner

*Primary Examiner* — Randy W Gibson
(74) *Attorney, Agent, or Firm* — Norris McLaughlin, P.A.

(57) ABSTRACT

A conveyer for transport is provided that is equipped with a driving roller disposed on one side in a direction of transport, a driven roller disposed on the other side in the direction of transport, a conveyer frame to which the driving roller and the driven roller are mountable, and a conveyer belt wound around the driving roller and the driven roller. The conveyer frame includes a pair of side plates that axially supports both ends of the driving roller and of the driven roller, and a top plate that slides along and contacts an inner peripheral surface of the conveyer belt. The top plate has a plurality of openings.

7 Claims, 11 Drawing Sheets

CONVEYER AND COMBINATION SCALE EQUIPPED WITH THE SAME

TECHNICAL FIELD

This invention relates to a conveyer for transport and a combination scale equipped with the conveyer.

BACKGROUND ART

Patent Literature 1 describes an example of conveyers for transport which is equipped with a conveyer belt, a driving roller, a driven roller, a conveyer belt wound around the driving and driven rollers, and a pedestal pivotally supporting these rollers. This conveyer is further characterized in that an inner peripheral surface of the conveyer belt slides along and contacts an upper peripheral surface of the pedestal.

CITATION LIST

Patent Document

Patent Document 1: JP 1999-343018 A

SUMMARY OF THE INVENTION

Technical Problems

In the conveyer described in Patent Literature 1, there is a large area of contact between the conveyer belt and the upper surface of the pedestal including a top plate. This may accelerate abrasion of the conveyer belt and may also invite a greater sliding resistance, leading to a greater driving load. Some weighing conveyers are for use in transport of foodstuffs, and such weighing conveyers are cleaned relatively often. Cleaning water used then may leave droplets between the conveyer belt and the upper surface of the pedestal. Such water droplets may be likely to form a membrane in portions where sliding contact occurs, and surface tension of the water membrane may often disturb smooth operation of the conveyer belt.

The transport conveyers are desirably smaller in weight for easy handling during the cleaning, and conveyers for use in weighing purpose, in particular, are more desirably lightweight. Weight sensors smaller in capacity may be usable in such lighter weighing conveyers with smaller tare weights. This may achieve an improved resolution and a resulting higher weighing accuracy.

This invention was accomplished to address these issues of the known art and is directed to providing a transport conveyer reducible in weight and allowed to minimize abrasion of a conveyer belt, and a combination scale equipped with the transport conveyer.

Technical Solution

To this end, this invention provides the following technical aspects.

1] A transport conveyer according to this invention includes:
   a driving roller disposed on one side in a direction of transport;
   a driven roller disposed on another side in the direction of transport;
   a conveyer frame to which the driving roller and the driven roller are mountable; and
   a conveyer belt wound around the driving roller and the driven roller.

The transport conveyer is further characterized in that the conveyer frame includes:
   a pair of side plates that axially supports both ends of the driving roller and of the driven roller; and
   a top plate that slides along and contacts an inner peripheral surface of the conveyer belt, and
   the top plate has a plurality of openings.

In the transport conveyer according to this invention, the openings formed in the top plate may allow the conveyer frame to reduce in weight and may also lead to a smaller area of contact between the inner peripheral surface of the conveyer belt and the top plate of the conveyer frame. Such a smaller area of contact may lead to less abrasion of the conveyer belt and a smaller sliding resistance, further leading to a smaller belt driving load. Further advantageously, the sliding resistance caused by droplets of cleaning water may be less variable, achieving a smooth belt operation.

2] In a preferred embodiment of this invention, the pair of side plates and the top plate are integrally formed by bending.

According to this embodiment, the side plates and the top plate are formed as an integral unit. This may conduce to cost reduction as compared with the side plates and the top plate being independently produced from different materials.

3] In other embodiments of this invention, the top plate has a groove formed by bending, the groove extending along an entire length thereof in the direction of transport at an intermediate position in a direction orthogonal to the direction of transport.

According to these embodiments, the formation of this groove by bending may simply decrease the area of contact between the tope plate and the conveyer belt and may also improve the top plate in rigidity. This may allow a thinner material to be used for the conveyer frame, conducing to weight reduction of the conveyer frame.

In other embodiments of this invention, one of the pair of side plates of the conveyer frame has a gear housing integrally formed at one end on a driver side thereof, the gear housing serving to house a gear disposed at one end of the driving roller.

According to these embodiments, an additional working process becomes unnecessary to form and attach an independent gear housing, leading to cost reduction.

5] A combination scale according to this invention includes: a plurality of weighing conveyers arranged in a row, the weighing conveyers transporting items to be weighed that are manually supplied; and a collection conveyer that transports the items discharged from the weighing conveyers along a direction of arrangement of the weighing conveyers, the transport conveyer recited in one of 1] to 4] constituting each of the weighing conveyers.

The combination scale according to this invention may achieve the following advantages: successful control of abrasion of the conveyer belt, reducing the number of belt replacements; easy and speedy removal for cleaning of the lighter and easily handleable weighing conveyers, facilitating maintenance; and the lighter weighing conveyers leading to use of weight sensors smaller in capacity and improved in resolution, achieving a higher weighing accuracy.

Effects of the Invention

As described thus far, this invention may successfully provide a transport conveyer reducible in weight and allowed to control abrasion of a conveyer belt, and a combination scale equipped with the transport conveyer.

DESCRIPTION OF EMBODIMENTS

Embodiments of this invention are hereinafter described in detail with reference to the accompanying drawings.

Figure 1:
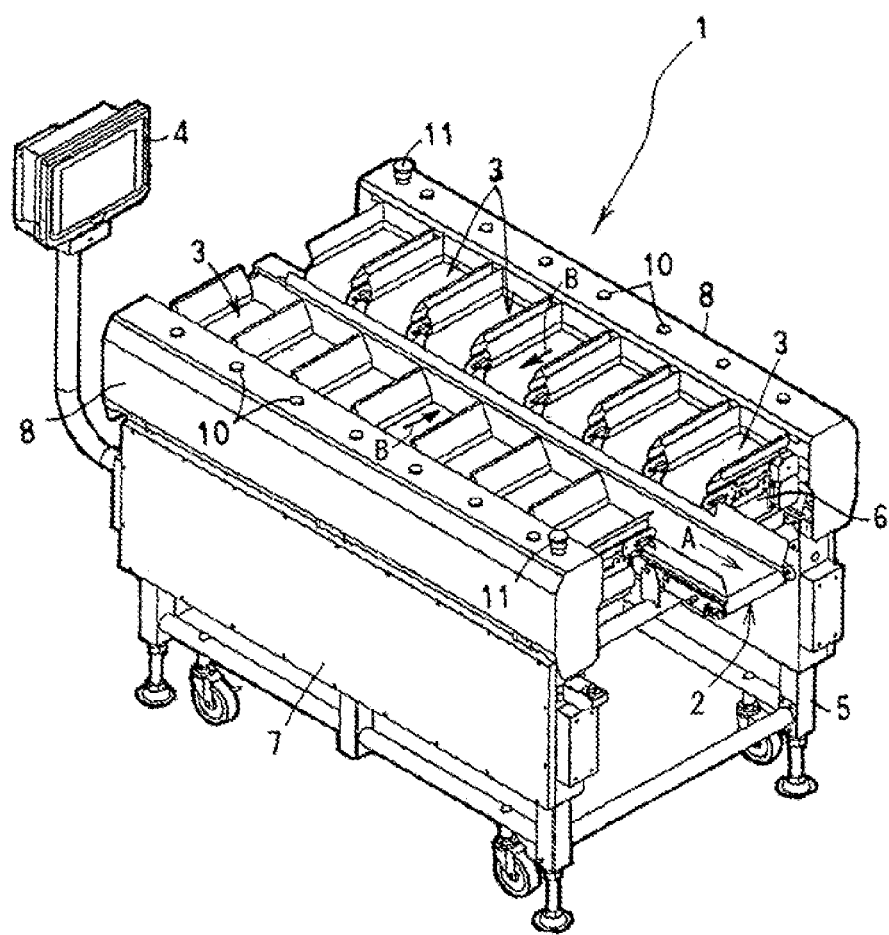
FIG. 1 is a perspective view of a combination scale equipped with a transport conveyer according to an embodiment of this invention.
Figure 2:
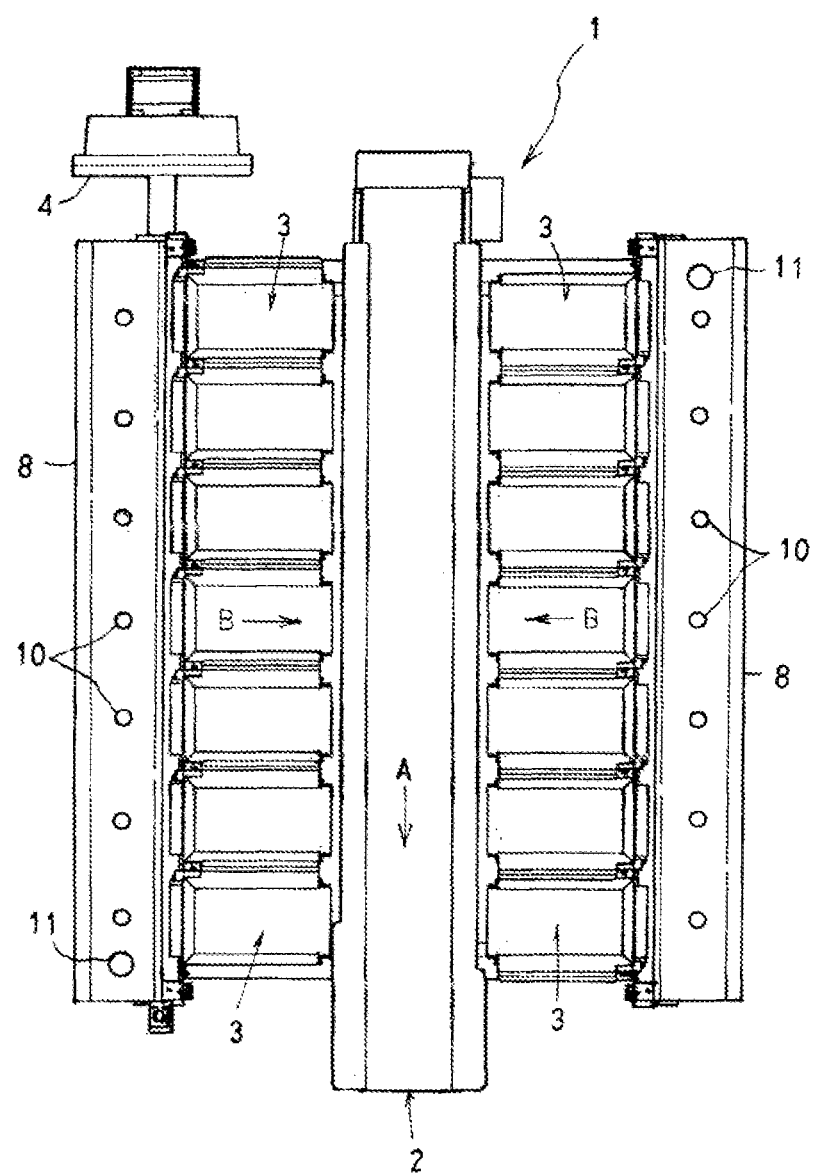
FIG. 2 is a plan view of the combination scale illustrated in FIG. 1.
Figure 3:
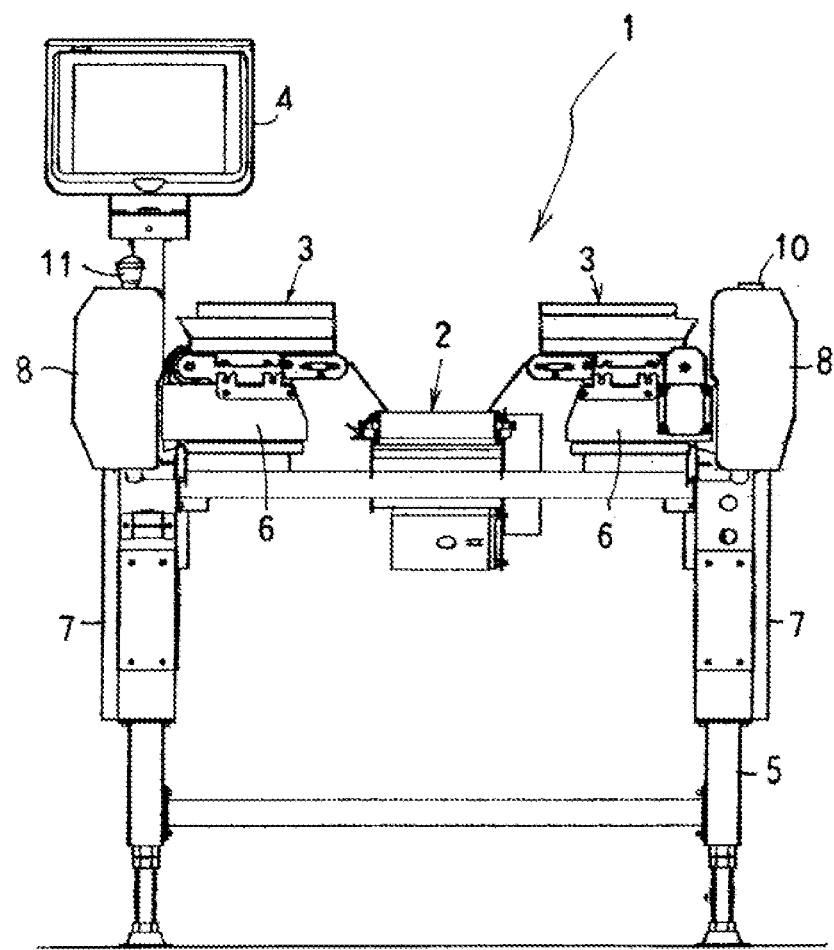
FIG. 3 is a front view of the combination scale illustrated in FIG. 1.

FIG. 1 is a perspective view of a combination scale 1 according to an embodiment of this invention. FIG. 2 is a plan view of the combination scale 1. FIG. 3 is a front view of the combination scale 1.

The combination scale 1 according to this embodiment is a semiautomatic combination scale. An operator manually supplies this combination scale with items to be weighed, and the combination scale mechanically discharges the items having a weight that falls within a predetermined range of weights. The combination scale 1 includes a collection conveyer 2, a plurality of weighing conveyers 3, an operation setting displayer 4 of touch panel type, and a pedestal 5. The collection conveyer 2 includes a belt conveyer that transports the items in a direction of transport A. The weighing conveyers 3 each including a belt conveyer are arranged in rows on both sides of the collection conveyer 2. The operation setting displayer 4 displays thereon operation statuses and parameter settings for operation control of the combination scale 1. These devices are supported by the pedestal 5.

The collection conveyer 2 transports the items of a weight that falls within a predetermined range of weights and that have been discharged from the weighing conveyers 3. The collection conveyer 2 then discharges the items into a packaging machine disposed in a later stage of the scale. The discharged items will be packed into bags in the packaging machine.

The weighing conveyers 3 arranged in two rows; seven weighing conveyers in each row in the illustrated example, are disposed as weight measuring units on lateral sides of the collection conveyer 2 along the direction of transport of this conveyer. The weighing conveyers 3 of the respective rows are linearly arranged on both sides of the collection conveyer 2. The weighing conveyers 3 transport the items in a direction of transport B orthogonal to the direction of transport A of the collection conveyer 2.

The weighing conveyers 3; a conveyer unit including transport conveyers according to an embodiment of this invention, are detachably supported by load measuring units 6 arranged in rows in an upper part of the pedestal 5. The weight of the weighing conveyer containing the items is detected by a weight sensor, like a load cell, embedded in the load measuring unit 6, and the detected weight is transmitted to a controller not illustrated in the drawings. The weighing conveyer 3 is driven by a driving motor embedded in the load measuring unit 6.

An operator manually feeds the items into the empty weighing conveyers 3 currently inactive. The weight of each weighing conveyer 3 is detected by the weight sensor. Based on the detection output of the weight sensor, the controller not illustrated in the drawings obtains weight values of the items and executes combinatorial computations. The combinatorial computations variously combine the weights of the items in the weighing conveyers 3 and then select, as discharge-target weighing conveyers, a combination of weighing conveyers having a summed weight that falls within a predetermined range of weights. In case there are two or more combinations of discharge-target weighing hoppers having a summed weight that falls within a predetermined range of weights, one of the combinations is selected that has a smallest absolute value of a difference between the obtained combined weight and a target combined weight. The items in the weighing conveyers 3 selected for discharge are transported and discharged onto the collection conveyer 2 by the weighing conveyers 3. The items on the collection conveyer 2 are then transported into the packaging machine.

For clear and easy understanding of what is described herein, the following directions are hereinafter defined; "lateral direction" as the direction of arrangement of the weighing conveyers 3 (longitudinal direction of the collection conveyer 2), and "front-back direction" as the longitudinal direction of the weighing conveyers 3.

Control boxes 7 are disposed at positions outward and below the weighing conveyers 3 on both sides of the collection conveyer 2, i.e., at positions on the outer side of transport-starting ends in the direction of transport of the weighing conveyers 3. The control boxes 7 are supported by the pedestal 5 and each include a power supply unit and a control board. By thus having the control boxes 7 disposed outward and below the weighing conveyers 3 on both sides of the collection conveyer 2, there is an unoccupied open space below the collection conveyer 2.

Thus, any broken pieces or scraps of the items, if they fall from the weighing conveyers 3 or the collection conveyer 2, may be invited to drop onto the floor surface. Such broken pieces or scraps of the items and/or cleaning water may be unlikely to stay on the upper surface of the control box, and the combination scale may be kept in a sanitary condition.

The open space left unoccupied below the collection conveyer 2 and the load measuring units 6 of the weighing conveyers 3 may offer a large working area for maintenance and cleaning of the collection conveyer 2.

Protective covers 8, which are laterally long, are attached to upper parts of the respective control boxes 7 to cover these control boxes. The protective covers 8 are located between the weighing conveyer 3 and an operator who manually supplies the weighing conveyers 3 with the items to be weighed. These protective covers, therefore, may successfully prevent accidental contact of the operator with a driver or transport-starting end of the weighing conveyer 3. This may avoid the risk of errors in weighing the items using the weighing conveyers 3 and may also ensure an improved safety.

Figure 4:
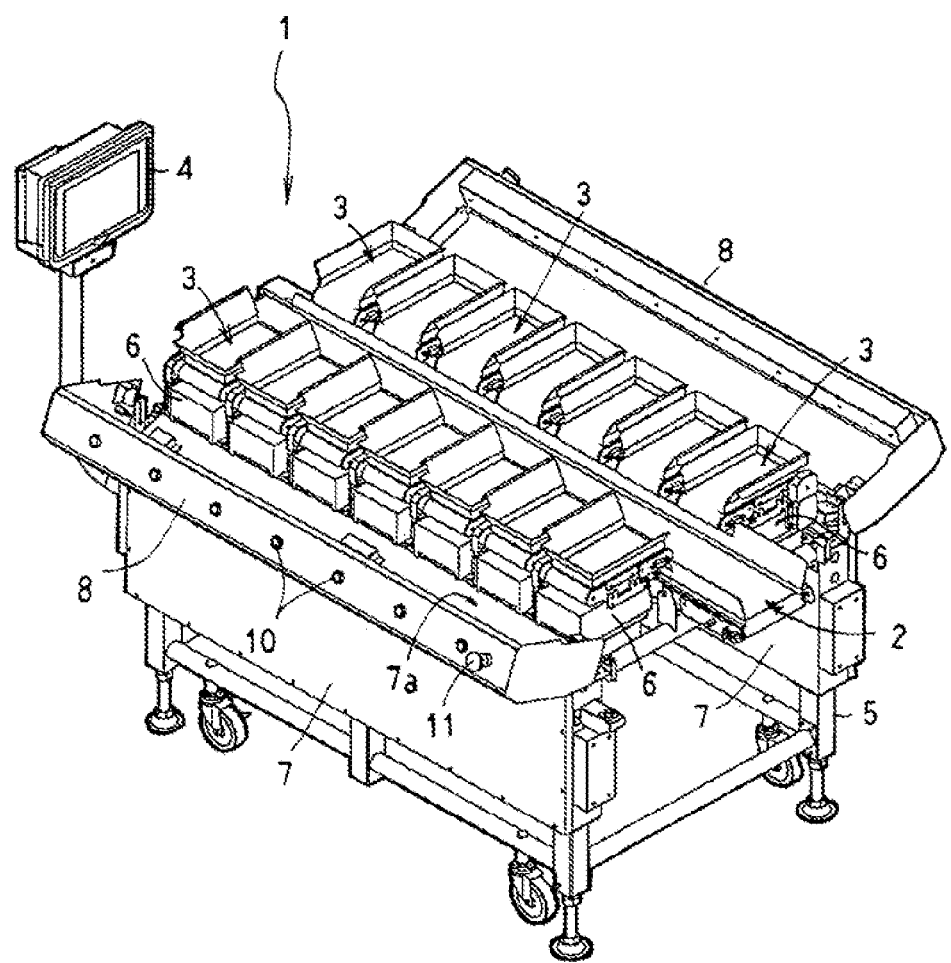
FIG. 4 is a perspective view of the combination scale when protective covers are opened.
Figure 5:
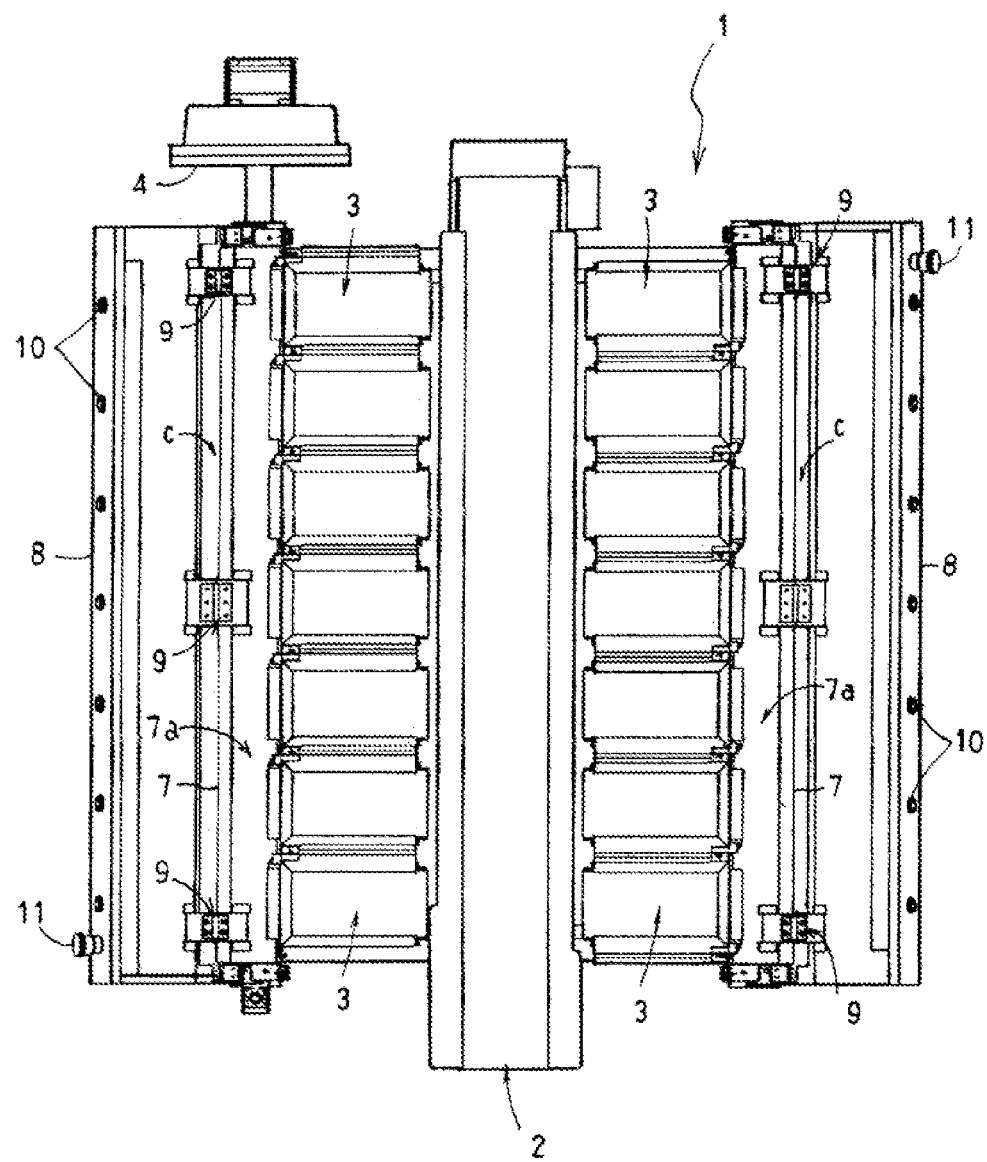
FIG. 5 is a plan view of the combination scale when the protective covers are opened.
Figure 6:
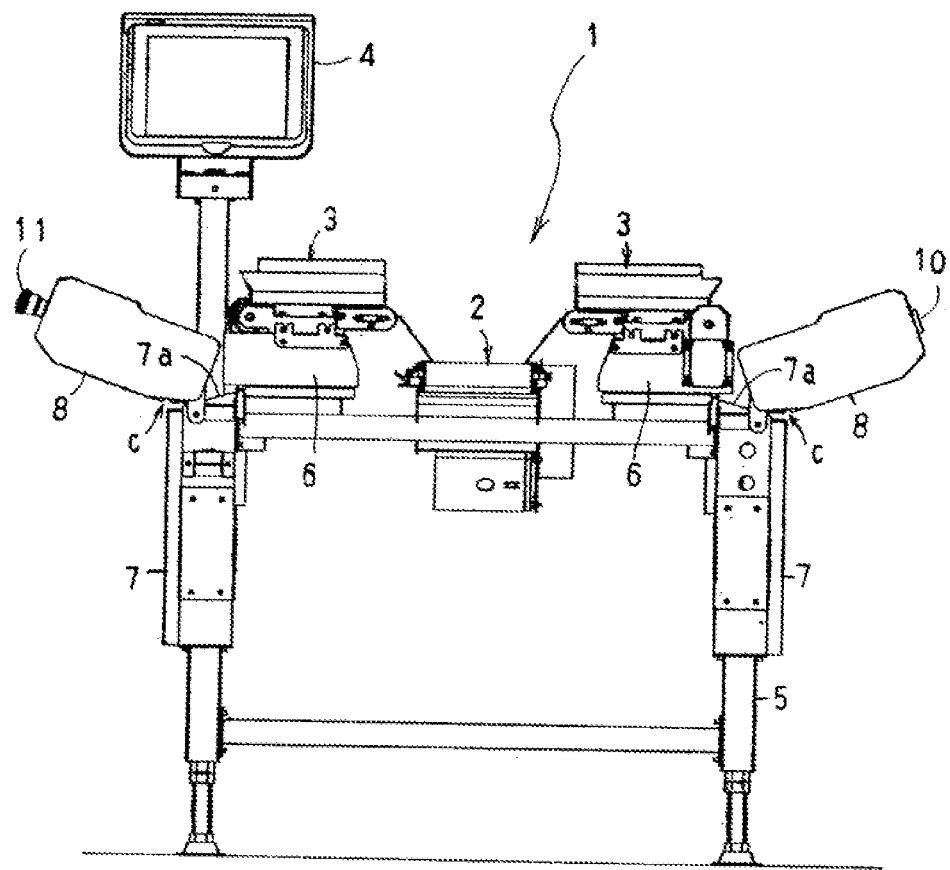
FIG. 6 is a front view of the combination scale when the protective covers are opened.

FIG. 4 is a perspective view of the combination scale 1 when the protective covers 8 are opened. FIG. 5 is a plan view of the combination scale 1 when the protective covers 8 are opened. FIG. 6 is a front view of the combination scale 1 when the protective covers 8 are opened.

As illustrated in FIG. 5, the protective covers 8 are attached rotatably and supportably to the upper parts of the control boxes 7 through a plurality of hinges 9. As illustrated in FIGS. 1 to 3, the protective covers 8 are each allowed to shift to and from a closing position and an opening position. At the closing position, the protective cover is pulled upward to close. At the opening position, the protective cover is rotated downward and outward to open (away from the collection conveyer 2 at the center). The protective cover 8 at the closing position is close to and facing the transport-starting ends in the direction of transport of the weighing conveyers 3. The protective cover 8 at the opening position exposes its inner surface and also exposes the load measuring units 6 and the transport-starting ends in the direction of transport of the weighing conveyers 3.

The hinge 9 is a torque hinge that imparts an appropriate level of resistance to the rotation of the protective cover 8. The protective covers 8 using such torque hinges may be allowed to stay at both of the closing and opening positions in a stable manner.

The protective covers 8 have, on their upper surfaces, display lights 10 that are disposed correspondingly to the weighing conveyers 3. Further, the protective covers 8 each have an emergency stop button 11. The display light 10 notifies the operator that the items in the relevant weighing conveyer 3 have a weight beyond a range of optimal weights, inviting the operator to resupply or change the items. These display lights 10 and the emergency stop buttons 11 are waterproofed and then connected to the control boxes 7.

The protective covers 8 are kept at the closing positions during the normal operation but are opened when cleaning starts. Then, the weighing conveyers 3 are removed to wash off any broken pieces and scraps of the items. The control boxes 7 each have an upper surface 7a inclining downward toward the outer side, as illustrated in FIG. 6. Further, an interval c for water drainage is formed between the opened protective cover 8 and an outer edge in the upper part of each control box 7, as illustrated in FIGS. 5 and 6. Thus, cleaning water may be guided to run outward and downward along the inclining upper surface 7a of the control box 7 to be finally discharged through the interval c. This may avoid the risk of the cleaning water being left on the upper surface 7a of the control box 7.

Next, structural features of the weighing conveyers 3 are described below.

Figure 7:
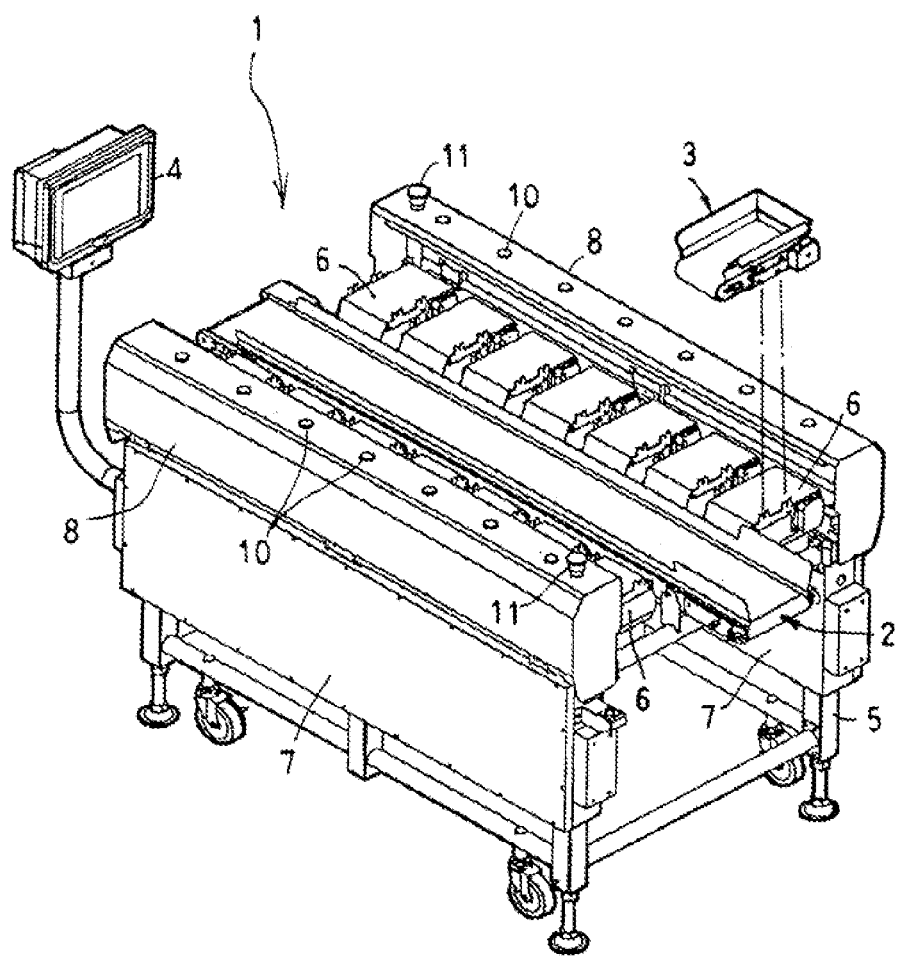
FIG. 7 is a perspective view of the combination scale in which weighing conveyers have been removed from load measuring units.
Figure 8:
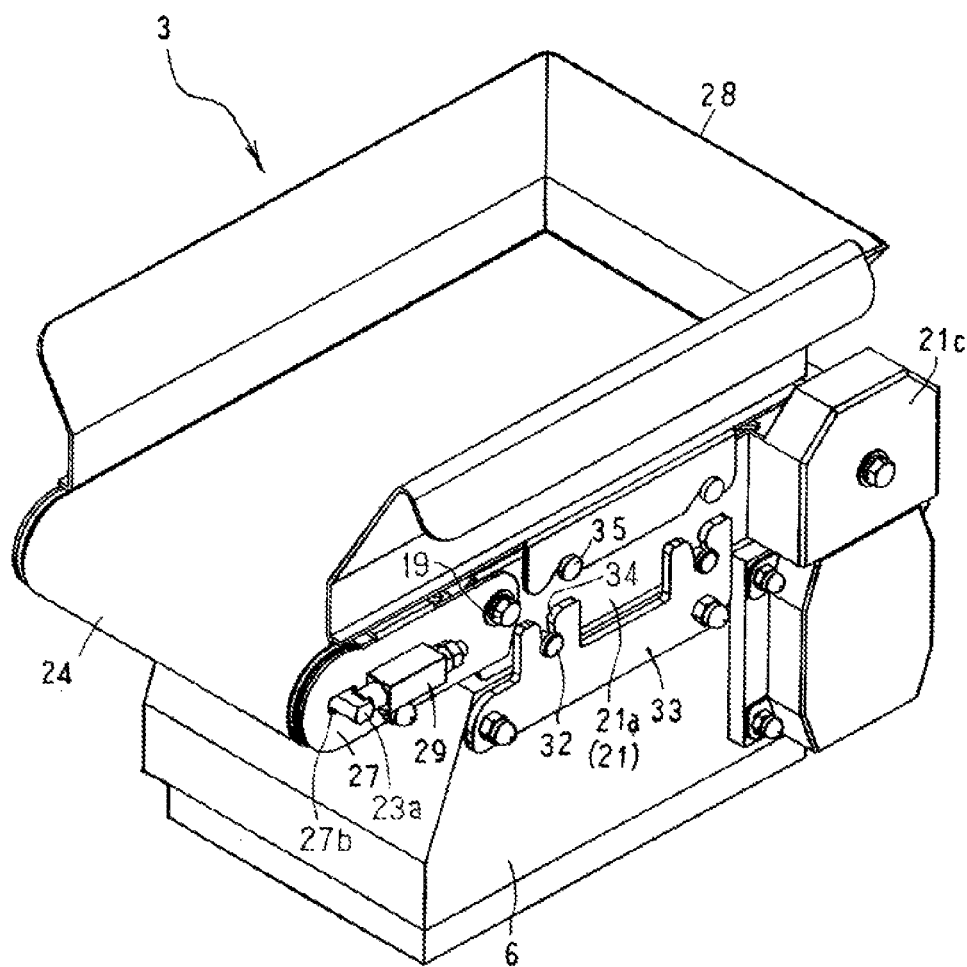
FIG. 8 is a perspective view of the weighing conveyer.
Figure 9:
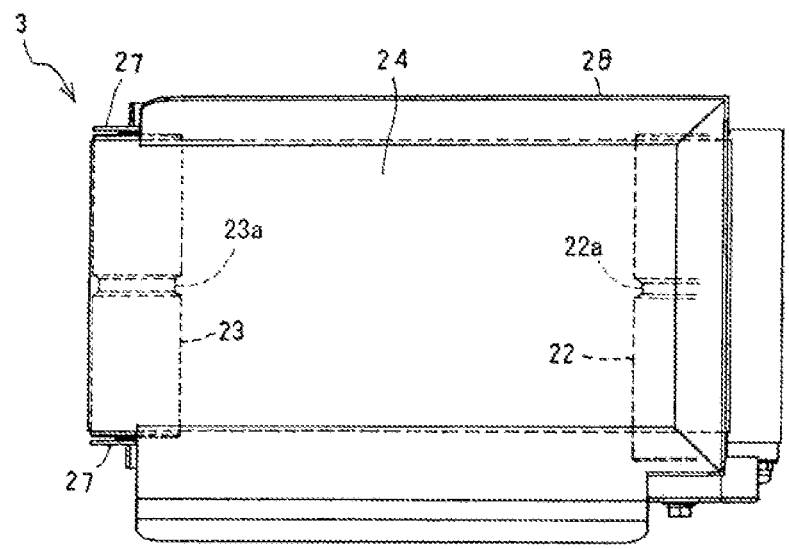
FIG. 9 is a plan view of the weighing conveyer.
Figure 10:
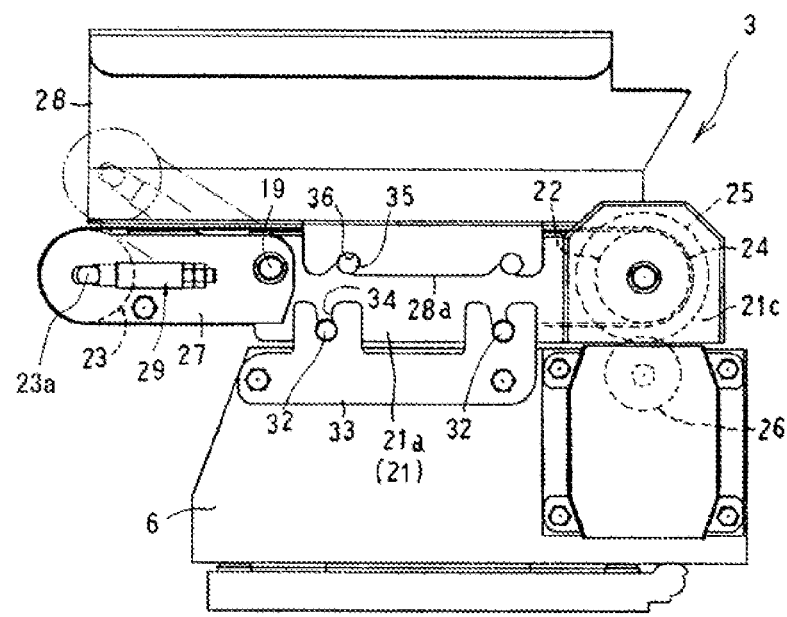
FIG. 10 is a side view of the weighing conveyer.
Figure 11:
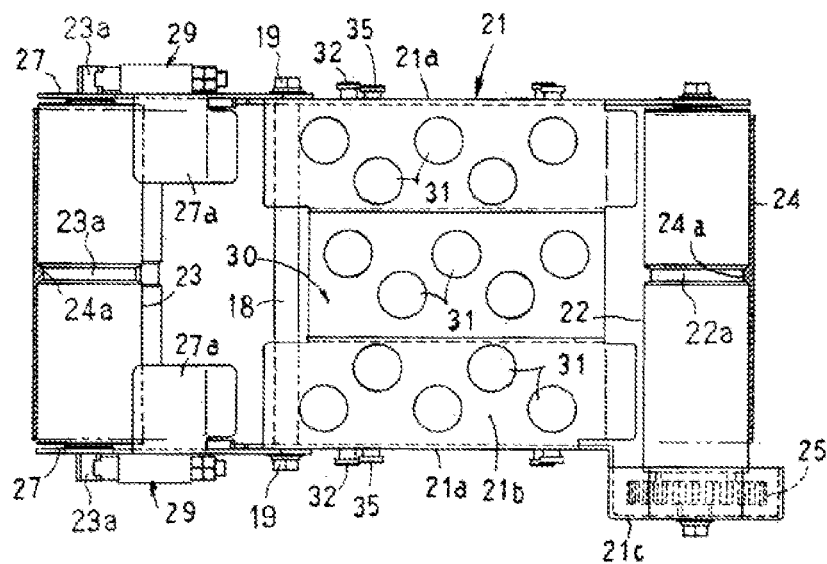
FIG. 11 is a plan view of conveyer frames in the weighing conveyers.
Figure 12:
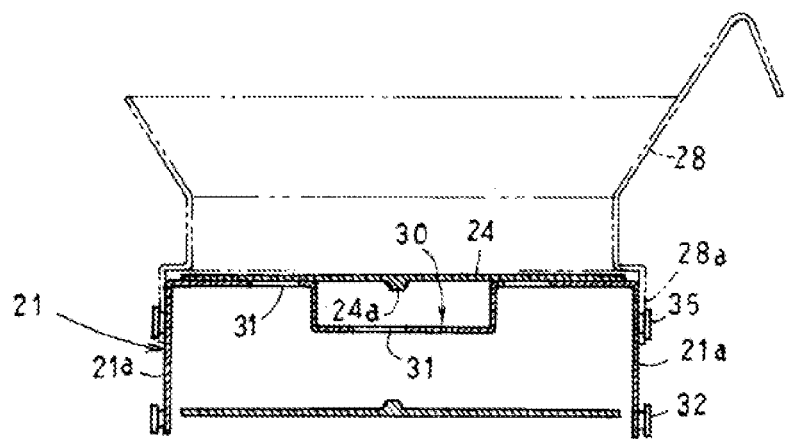
FIG. 12 is a longitudinal front view of the conveyer frame.
Figure 13:
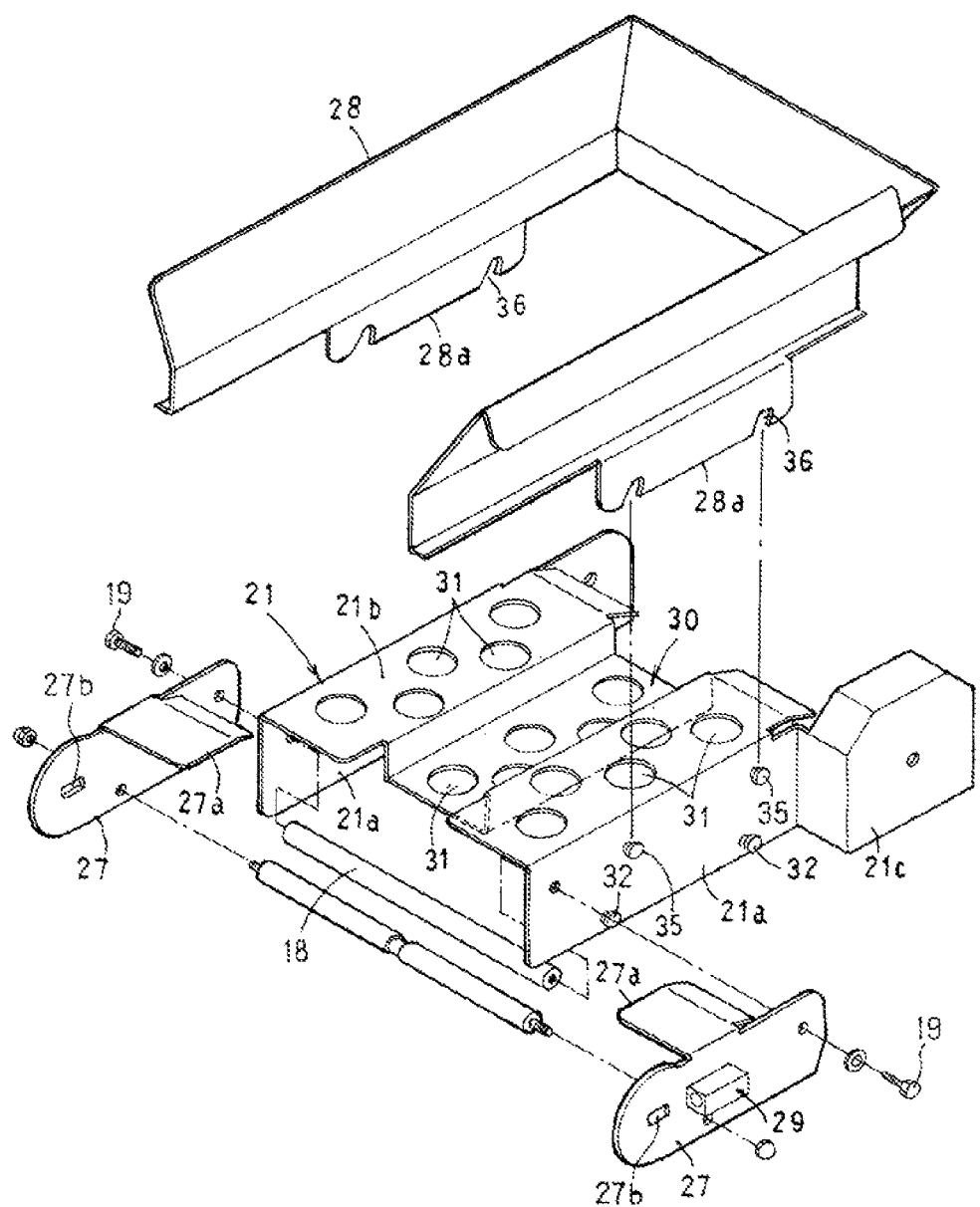
FIG. 13 is an exploded perspective view of the conveyer frame.

FIG. 7 is a perspective view of the combination scale 1 from which the weighing conveyers 3 have been removed. FIG. 8 is a perspective view of the weighing conveyer 3. FIG. 9 is a plan view of the weighing conveyer 3. FIG. 10 is a side view of the weighing conveyer 3. FIG. 11 is a plan view of conveyer frames 21 in the weighing conveyers 3. FIG. 12 is a longitudinal front view of the conveyer frame 21. FIG. 13 is an exploded perspective view of the conveyer frame 21.

The weighing conveyer 3 has a driving roller 22, a tension roller 23, and a wide conveyer belt 24. The driving roller 22 is pivotally supported on the transport-starting side in the direction of transport of the conveyer frame 21. The tension roller 23 is pivotally supported on the transport-ending side in the direction of transport of the conveyer frame 21. The conveyer belt 24 is wound around the driving roller 22 and the tension roller 23.

A driven gear 25 is coupled to one end of the driving roller 22, as illustrated in FIGS. 10 and 11. This driven gear 25 is meshed, from the upper side, with a driving gear 26 of the load measuring unit 6. The driving gear 26 is interlocked with a driving motor housed in the load measuring unit 6, though the driving motor is not illustrated in the drawings. The driving gear 26 is exposed upward in an upper part of the load measuring unit 6.

As illustrated in FIG. 13, the conveyer frame 21 includes a top plate 21b and a pair of side plates 21a facing each other. The side plates 21a and the top plate 21b are formed by press working of metallic, plate-shaped materials, for example, stainless steel. These side and top plates are integrally formed by bending the plate-shaped materials. This may conduce to cost reduction as compared with the side plates and the top plate being independently produced from different materials.

The driving roller 22 is pivotally supported in a freely rotatable manner by the side plates 21a at one end (rear end) of the conveyer frame 21.

On the sides plates 21a at the other end (front end) of the conveyer frame 21, bearing brackets 27 are coupled with bolts 19 to both ends of a coupling shaft 18 interposed between the side plats 21a. The tension roller 23 is pivotally supported by these bearing brackets 27 in a freely rotatable manner. The tension roller 23 is also slidably and elastically biased outward by spring-embedded tension mechanisms 29.

The bearing brackets 27 each have, at its front end, an engaging hole 27b. Both ends of a support shaft 23a of the tension roller 23 are inserted through the engaging holes 27b. The support shaft 23a is supported in a non-rotatable manner at front ends of the tension mechanisms 29 attached to the bearing brackets 27. The support shaft 23a is also elastically biased forward by the springs embedded in the tension mechanisms 29. These structural features constitute an automatic tension mechanism that strains forward the conveyer belt 24 wound around the tension roller 23.

The weighing conveyers 3 are removed from the load measuring units 6, and item-feeding guides 28 described later are then removed. Then, the bearing brackets 27 are rotated upward around the bolt-attached coupling shaft 18, as illustrated with a virtual line in FIG. 10. When the bearing brackets 27 are rotated upward, the conveyer belt 24 is loosened and easily removable from a lateral side of the conveyer frame 21.

An item-feeding guide 28 is detachably mounted to the conveyer frame 21. The item-feeding guide 28 serves to prevent the items from falling off the conveyer and is so shaped that extends substantially upright on both sides in the direction of width of the conveyer belt 24 and on the transport-starting side in the direction of transport.

The driving roller 22 and the tension roller 23, though their detailed structural features are not illustrated in the drawings, are supported through bearings in a freely rotatable manner by support shafts inserted along their shaft centers. Both ends of the support shaft of the driving roller 22 are secured to the side plates 21a of the conveyer frame 21. The support shaft of the tension roller 23 is inserted through and supported by the bearing brackets 27 in a manner that the support shaft is slidable back and forth but is not rotatable.

A gear housing 21c, in which the driven gear 25 of the driving roller 22 is containable, is formed continuous to one end of one of the side plates 21a of the conveyer frame 21. This gear housing 21c has such a protruding shape that covers and hides the driven gear 25 from the outer side and also from the upper side. The gear housing 21c has an open lower end, so that a lower end of the driven gear 25 is allowed to mesh with an exposed upper end of the driving gear 26. The gear housing 21c thus integral with one of the side plates 21a makes a process to attach an independent gear housing unnecessary, leading to cost reduction. Further advantageously, the formation of the gear housing 21c by bending may improve the side plates 21a in rigidity.

The top plate 21b of the conveyer frame 21 slides along and contacts, from the lower side, an inner peripheral surface of the conveyer belt 24 would around the rollers. The top plate 21b has a groove 30 formed along its entire length at a laterally middle position. This groove 30 has a rectangular shape in cross section having both sides bending downward at substantially the right angle and lower ends on these both sides bending laterally at substantially the right angle. This groove has a width of more than ⅓ of the width of the top plate 21b. The groove 20 thus formed by bending may serve as a rib, improving the whole conveyer frame 21 in rigidity. This may allow the conveyer frame 21 to reduce in thickness and weight.

Further advantageously, this groove 30 may serve to avoid any interference with a guiding projection 24a illustrated in FIGS. 11 and 12. This guiding projection 24a is formed on the inner peripheral surface of the conveyer belt 24 to prevent meandering movements.

The guiding projection 24a on the inner peripheral surface of the conveyer belt 24 is engaged with guiding grooves 22a and 23a formed in the outer peripheral surfaces of the diving roller 22 and of the tension roller 23, as illustrated in FIG. 11. This may prevent the rotating conveyer belt 24 from meandering in the lateral direction.

From each of the bearing brackets 27 is extended a cantilever-type belt guide 27a to prevent sagging of the conveyer belt 24 between the tension roller 23 and the top plate 21b, as illustrated in FIGS. 11 and 13.

The top plate 21b of the conveyer frame 21 has a plurality of circular openings 31 formed in a staggered manner. The formation of such openings achieves two objects; reduction of the weight of the whole conveyer belt 24, and reduction of the area of contact of the top plate 21b with the conveyer belt 24, leading to less sliding resistance. Further, the staggered formation of these openings 31 may effectively prevent the top plate 21b from degrading in strength.

The openings 31 are formed by punching the top plate 21b from its surface side, and surface-side edges of these openings may accordingly have rounded surfaces and need not be chamfered.

At lower positions on the outer surface of each side plate 21a of the conveyer frame 21 are disposed headed coupling pins 32 that are paired on the front and back sides of this frame. The coupling pins 32 are insertable and removable, from the upper side, in and out of engaging grooves 34 of coupling fittings 33 mounted vertically to outer side surfaces of the load measuring unit 6. The conveyer frame 21 is inserted into between the coupling fittings 33, and the coupling pins 32 are slightly forced into the engaging grooves 34. As a result, the weighing conveyer 3 is positionally fixed in front-back and right-left directions and securely fitted to the load measuring unit 6.

As a result of the weighing conveyer 3 being thus secured, the driven gear 25 of the driving roller 22 may be mechanically meshed with the driving gear 26, in response to which the weighing conveyer 3 is driven to operate. By having the conveyer frame 21 pulled upward out of the coupling fittings 33, the weighing conveyer 3 is separable from the load measuring unit 6, and interlocking with the driving gear 26 is automatically released.

The conveyer frame 21 of the weighing conveyer 3 may be thus positionally fixed in the vertical direction and engaged with the load measuring unit 6. The conveyer frame 21, for such an event as cleaning, may be readily and speedily removed from and attached to the load measuring unit 6 of the weighing conveyer 3.

At upper positions on the outer surface of each side plate 21a of the conveyer frame 21 are disposed headed coupling pins 35 that are paired on the front and back sides of this frame. The coupling pins 35 are insertable and removable, from the lower side, in and out of engaging grooves 36 of coupling sides 28a extending downward from lateral lower ends of the item-feeding guides 28. The side plates 21a are pushed into between the coupling sides 28a, and the coupling pins 35 are forced into the engaging grooves 36. As a result, the item-feeding guides 28 are positionally fixed in front-back and right-left directions and securely fitted to the conveyer frame 21.

According to this embodiment, the formation of the openings 31 in the top plate 21b of the conveyer frame 21 decreases the area of contact of the top plate 21b with the inner peripheral surface of the conveyer belt 24. This may reduce the risk of abrasion of the conveyer belt 24 and may also reduce the sliding resistance, leading to a smaller belt driving load. Further advantageously, variability of the sliding resistance caused by droplets of cleaning water may also reduce, allowing a smooth belt operation.

This embodiment may achieve the following advantages: successful control of abrasion of the conveyer belt 24, reducing the number of belt replacements; easy and speedy removal for cleaning of the lighter and easily handleable weighing conveyers 3, facilitating maintenance; and the lighter weighing conveyers 3 leading to use of weight sensors smaller in capacity and improved in resolution, achieving a higher weighing accuracy.

OTHER EMBODIMENTS

The scope of this invention may further include the following aspects.

1] The openings 31 formed in the top plate 21b of the conveyer frame 21 each have a circular shape in the earlier embodiment. Instead, the openings 31 may have other optional shapes, for example, elliptical shape or slit-like shape elongated in the direction of transport. Regardless of any optional shape of the openings, the staggered arrangement may likewise reduce the risk of strength degradation.

2] In the earlier embodiment, the transport conveyer according to this invention is applied to the weighing conveyer of the semi-automatic combination scale 1. This invention is also applicable to general-purpose transport conveyers simply configured to carry and transport items.

REFERENCE SIGNS LIST 1 combination scale
2 collection conveyer
3 weighing conveyer (transport conveyer)
21 conveyer frame 21a side plate
21b top plate
22 driving roller
23 tension roller (driven roller)
24 conveyer belt
24a guiding projection
28 item-feeding guide
30 groove
31 opening

The invention claimed is:

1. A transport conveyer, comprising:
a driving roller disposed on one side in a direction of transport;
a driven roller disposed on another side in the direction of transport;
a conveyer frame to which the driving roller and the driven roller are mountable; and
a conveyer belt wound around the driving roller and the driven roller,
the conveyer frame comprising:
a pair of side plates that axially supports both ends of the driving roller and of the driven roller; and
a top plate that slides along and contacts an inner peripheral surface of the conveyer belt,
the top plate comprising a plurality of openings.

2. The transport conveyer according to claim 1, wherein the pair of side plates and the top plate are integrally formed by bending.

3. The transport conveyer according to claim 1, wherein the top plate comprises a groove formed by bending, the groove extending along an entire length thereof in the direction of transport at an intermediate position in a direction orthogonal to the direction of transport.

4. The transport conveyer according to claim 2, wherein the top plate comprises a groove formed by bending, the groove extending along an entire length thereof in the direction of transport at an intermediate position in a direction orthogonal to the direction of transport.

5. The transport conveyer according to one of claims 1 to 4, wherein
one of the pair of side plates of the conveyer frame comprises a gear housing integrally formed at one end on a driver side thereof, the gear housing serving to house a gear disposed at one end of the driving roller.

6. A combination scale, comprising:
a plurality of weighing conveyers arranged in a row, the weighing conveyers transporting items to be weighed that are manually supplied; and
a collection conveyer that transports the items discharged from the weighing conveyers along a direction of arrangement of the weighing conveyers,
the transport conveyer according to one of claims 1 to 4 constituting each of the weighing conveyers.

7. A combination scale, comprising:
a plurality of weighing conveyers arranged in a row, the weighing conveyers transporting items to be weighed that are manually supplied; and
a collection conveyer that transports the items discharged from the weighing conveyers along a direction of arrangement of the weighing conveyers,
the transport conveyer according to claim 5 constituting each of the weighing conveyers.

* * * * *